US012626297B2

(12) United States Patent
Moyal et al.

(10) Patent No.: US 12,626,297 B2
(45) Date of Patent: May 12, 2026

(54) RECOMMENDING ELECTRONIC PRODUCTS BASED ON USER SPECIFICATION

(71) Applicant: International Business Machines Corporation, Armonk, NY (US)

(72) Inventors: Shailendra Moyal, Pune (IN); Venkata Vara Prasad Karri, Visakhapatnam (IN); Sarbajit K. Rakshit, Kolkata (IN); Akash U. Dhoot, Pune (IN)

(73) Assignee: International Business Machines Corporation, Armonk, NY (US)

( * ) Notice: Subject to any disclaimer, the term of this patent is extended or adjusted under 35 U.S.C. 154(b) by 901 days.

(21) Appl. No.: 17/555,478

(22) Filed: Dec. 19, 2021

(65) Prior Publication Data

US 2023/0196450 A1     Jun. 22, 2023

(51) Int. Cl.
G06Q 30/00 (2023.01)
G06Q 30/0601 (2023.01)
G06F 3/01 (2006.01)

(52) U.S. Cl.
CPC ..... G06Q 30/0643 (2013.01); G06Q 30/0631 (2013.01); G06F 3/011 (2013.01)

(58) Field of Classification Search
None
See application file for complete search history.

(56) References Cited

U.S. PATENT DOCUMENTS

| | | | | |
|---|---|---|---|---|
| 11,017,611 | B1 * | 5/2021 | Mount | G06V 20/20 |
| 12,182,848 | B2 * | 12/2024 | Beauchamp | G06Q 30/0627 |
| 2017/0132841 | A1 | 5/2017 | Morrison | |
| 2020/0060007 | A1 * | 2/2020 | Harrison | H05B 47/105 |
| 2020/0104898 | A1 | 4/2020 | Cui | |
| 2021/0160018 | A1 | 5/2021 | Han | |
| 2021/0312523 | A1 * | 10/2021 | Luo | G06V 40/169 |

FOREIGN PATENT DOCUMENTS

IN        201611020514        2/2018

* cited by examiner

Primary Examiner — Mila Airapetian
(74) Attorney, Agent, or Firm — Daniel M. Yeates

(57)     ABSTRACT

In an approach to recommend electronic products based on user specifications in an immersive reality environment, a computer-implemented method includes one or more processors configured for receiving user environment data comprising one or more of spatial data and image data corresponding to a user environment and receiving user input data corresponding to a user specified requirement in a virtual reality environment. Further, the computer-implemented method is configured for determining one or more product recommendations corresponding to one or more electronic devices based on the user specified requirement. Further, the computer-implemented method is configured for generating in a user interface of a virtual reality device, an augmented reality environment comprising virtual models of the one or more electronic devices displayed within the user environment.

17 Claims, 4 Drawing Sheets

RECOMMENDING ELECTRONIC PRODUCTS BASED ON USER SPECIFICATION

BACKGROUND

The present invention relates generally to the field of immersive reality shopping, and more particularly to recommending electronic products using immersive reality assistive devices.

Electronic product consumers have specific needs in mind when shopping for electronic devices for homes, offices, and commercial spaces. Various factors are considered when determining product specifications, features, and desired experience. The size and acoustics of a room may be key information needed to design a home entertainment system with a surround sound system, large screen display and lighting. While shopping in a consumer electronics store, a design center may be provided for consumers to explore various home entertainment and experience options. The design centers have various consumer electronics installed and on display for consumers to explore and gather information to assist in their own design. Consumers may have control access to each consumer electronic device to make modifications and adjustments to explore the full range of features and specifications of the consumer electronic devices.

SUMMARY

Embodiments of the present invention disclose a computer-implemented method, a computer program product, and a computer system for recommending electronic products based on user specifications in an immersive reality environment. The computer-implemented method includes one or more processors configured for receiving user environment data comprising one or more of spatial data and image data corresponding to a user environment. Further, the computer-implemented method may be configured for receiving user input data corresponding to a user specified requirement in a virtual reality environment. Further, the computer-implemented method may be configured for determining one or more product recommendations corresponding to one or more electronic devices based on the product specification data to satisfy the user specified requirements. Further, the computer-implemented method may be configured for generating in a user interface of a virtual reality device, an augmented reality environment comprising virtual models of the one or more electronic devices displayed within the user environment.

DETAILED DESCRIPTION

Figure 1:
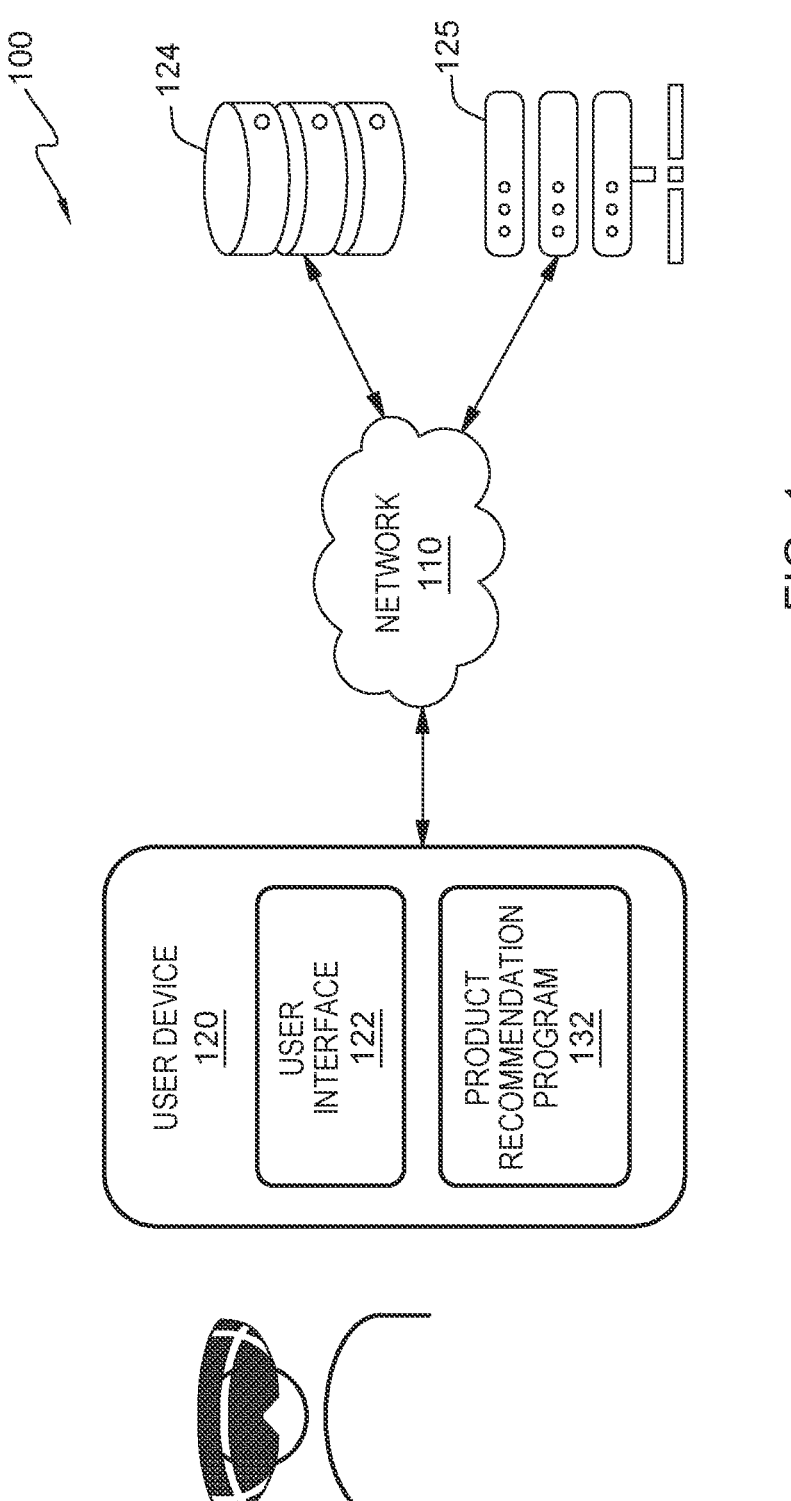
FIG. 1 is a functional block diagram illustrating a distributed data processing environment, in accordance with an embodiment of the present invention.

Embodiments of the present invention recognize that shoppers are realizing a greater need for mobility and assisted living, especially during global pandemics when staying at home decreases a person's chance of contracting a respiratory disease. Countless personalized shopping services, home delivery services, and touchless shopping services have emerged during the COVID-19 pandemic to facilitate consumer safety while maintaining some semblance of normalcy throughout the global economy. Public health organizations and other government agencies have urged shoppers to stay at home unless necessary and recommending safety precautions while navigating our cities and towns in public spaces. Shoppers are encouraged to socially distance and wash and/or sanitize hands and surfaces often to avoid touching surfaces that may have been infected with a communicable disease.

Embodiments of the present invention recognize that a customer may not be sufficiently familiar with a list of product specifications to fully grasp the product capabilities as it relates to the customer's requirements for the product. For example, the customer may be looking to satisfy an entertainment need in an environment and the customer may not be able to ascertain which product specifications will satisfy that entertainment need. Sometimes, one or more product accessories may be necessary to fill some product specification deficiencies, but the customer may not be aware of such accessories.

Embodiments of the present invention describe a computer-implemented method, a computer program product, and a computer system configured to allow a customer to specify their requirements for a product, prior to purchasing the product, in a virtual reality environment. Further, embodiments described herein may be configured to identify the customer specified product requirements, determine if one or more products may satisfy those requirements, and suggest one or more product accessories to accompany the identified product that is not, by itself, sufficient to satisfy the customer requirements. For example, the requirement may include a product outcome expectation with respect to the physical surrounding of the customer. Accordingly, embodiments described herein may be configured to identify appropriate products and/or accessories to accompany the product so that the customer specified requirements may be satisfied.

Embodiments of the present invention recognize that shoppers would benefit from a method and system by which before purchasing any product, the customer can specify requirements in an immersive (e.g., Augmented, Virtual) reality environment, to show how the outcome of the product can be used with respect to the customer's physical surrounding. Further, the proposed system may be configured for identifying appropriate product and or product accessories to achieve the specified requirement. Further, the computer-implemented method may be configured to define how the customer wants to use the product after purchase, and can define customer needs virtually, so that appropriate product or accessories can be recommended. Embodiments of the present invention may include existing product into the defined user environment and the existing products may be integrated with a new device as new accessories may be identified and recommended.

In some embodiments, a user may be equipped with a user device (e.g., virtual goggles, virtual reality headset) to navigate an immersive reality environment via a user interface of the user device. Further, the user device may be configured to detect a user action (e.g., body part gesture, voice command, text input command) instructing the user device to perform a function to assist the user.

Embodiments described herein may include one or more processors configured for receiving an indication that a user wearing the user device is navigating a physical equivalent of a virtual reality environment. Further, the computer-implemented method may include a smart home server configured to generate a digital version (e.g., virtual model) of an existing product within the virtual reality environment.

Embodiments described herein may include one or more processors configured for receiving user input data corresponding to a user specified requirement for a user environment, wherein the user specified requirement may be specified with a virtual reality environment. For example, a user may be navigating a home user environment while wearing a virtual reality headset and the user may specify a user requirement to have varying audio volumes from a single audio source in different rooms within the home environment. The virtual reality headset may include a user interface configured to receive and process the user requirement within the virtual reality environment and generate a simulation of the requirement with products and/or accessories configured to provide the result of the requirement.

Embodiments described herein may include a shopping system including a database of products and accessories and configured to generate digital models or virtual models of the products and accessories. As mentioned above herein, the computer-implemented method may be configured to generate a simulation of the requirement with products and/or accessories configured to provide the result of the requirement by recommending one or more of products, accessories, upgrades to existing products and/or accessors, or a combination thereof.

Further, embodiments described herein may include one or more processors configured to digitally identify products (e.g., electronic products) offered for sale by a retail entity and generate a virtual model of the products based on product specifications, capabilities, and features, of the electronic products.

Further, embodiments described herein may be configured to identify each product individually and generate a virtual reality simulation of the products in the virtual reality environment. Digital models of the products may be generated and displayed via the user interface in the virtual reality environment and each of the digital models may be uniquely identified.

Embodiments described herein may be configured to generate product recommendations include a combination of products and accessors to produce a virtual model consistent with the product capabilities and/or the specified user requirements. Embodiments described herein may also be configured to store, in a database, the virtual models produced as described herein, along with the combinations of products and accessories.

Embodiments described herein may also be configured to generate a virtual model or virtual environment of the user environment (e.g., physical environment) based on one or more image data captured by image sensors and image data corresponding to design files (e.g., computer aided design files, field sketches, plan files) of the user environment. Once the virtual model of the physical environment is generated, the virtual model may be displayed in a user interface of a computing device (e.g., virtual reality headset) for the user to visualize and interact with. Further, while specifying user's requirement, embodiments described herein may be configured to receive an indication that the user is navigating in the virtual environment and receive user input data corresponding to the user selectively creating requirement within the virtual reality environment.

Embodiments described herein may also be configured to receive data corresponding to a digital twin mode of existing products detected or identified within the user environment. Furthermore, based on the current condition and specification of the existing products, the proposed system may be configured for identifying current virtual models of each of the existing products. Additionally, embodiments described herein may be configured for identifying a location of the existing product in the physical equivalent virtual environment.

Furthermore, embodiments described herein may be configured to grant virtual reality system access to the user and configured to receive user input data corresponding to a user specified requirement, wherein the virtual reality system may be configured for using the physical equivalent of the virtual environment to allow the user to specify the requirement. While specifying the requirement, the user may specify the capability of the product recommended based on the requirement, wherein the capability may correspond to how the user intends to use the recommended product. The user can visually create the requirement in his virtual environment, while creating requirement, the user can perform mobility in the virtual environment.

Further, embodiments described herein may be configured to receive user input data corresponding to a user requirement created in the virtual surrounding. For example, a user requirement may include coverage boundary of a closed-circuit television (CCTV) camera, or from music listening boundary, audio amplitude in different sections of a room of the user environment, etc. The user can also create various contextual simulated environment, such as wind flow, weather condition, etc., and the same may be simulated in the virtual environment. Based on the specified requirement in the virtual surrounding, the virtual reality system may be configured to simulate the requirement with the products and with the existing product of the user. Embodiments of the present invention may also be configured for identifying if the existing products can be upgraded to satisfy the specified requirement.

Furthermore, embodiments described herein may be configured to identify if a new product must be purchased to satisfy for the specified requirement of the user. Further, combinations of accessories may also be considered to achieve the specified requirement, and accordingly, embodiments described herein may be configured for recommending appropriate products.

The present invention will now be described in detail with reference to the Figures.

FIG. 1 is a functional block diagram illustrating a data processing environment, generally designated 100, in accordance with one embodiment of the present invention. In an embodiment, data processing environment 100 may be a distributed data processing environment. The term "distributed" can describe a computer system that includes multiple, physically distinct devices that operate together as a single computer system. FIG. 1 provides only an illustration of one implementation and does not imply any limitations with regard to the environments in which different embodiments may be made by those skilled in the art without departing from the scope of the invention as recited by the claims.

Data processing environment 100 includes client computing device (e.g., user device 120), interconnected via network 110. Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between user device 120 and other computing devices (not shown) within data processing environment 100.

User device 120 can be a standalone computing device, a management server, a web server, a mobile computing device, or any other electronic device or computing system capable of receiving, sending, and processing data. In other embodiments, user device 120 can represent a server computing system utilizing multiple computers as a server system, such as in a cloud computing environment. In another embodiment, user device 120 can be a laptop computer, a tablet computer, a netbook computer, a personal computer (PC), a desktop computer, a personal digital assistant (PDA), a smart phone, a virtual reality computing device (e.g., virtual goggles, virtual headset, accompanying joysticks or controllers), or any programmable electronic device capable of communicating with other computing devices (not shown) within data processing environment 100 via network 110. In another embodiment, user device 120 represents a computing system utilizing clustered computers and components (e.g., database server computers, application server computers, etc.) that act as a single pool of seamless resources when accessed within data processing environment 100. User device 120 may include internal and external hardware components, as depicted, and described in further detail with respect to FIG. 4.

In various embodiments of the present invention, user device 120 can be one of a desktop computer, a laptop computer, a tablet computer, a smart phone, a smart wearable device, a vending machine, or any programmable electronic device capable of communicating with various components and devices within data processing environment 100, via network 110. In general, user device 120 represents any programmable electronic device or combination of programmable electronic devices capable of executing machine readable program instructions and communicating with other computing devices (not shown) within data processing environment 100 via a network, such as network 110.

In some embodiments, a screen of user device 120 is incorporated with user interface 122 of user device 120. In other embodiments, a display screen can be separate from user device 120, connected with a network, such as network 110, or computing cables. User device 120 includes product recommendation program 132. In various embodiments, product recommendation program 132 may reside on user device 120 in data processing environment 100, and accessible by user device 120 via network 110. User device 120 may include internal and external hardware components, as depicted and described in further detail with respect to FIG. 4.

In some embodiments, user device 120 may include user interface 122 to operate as a local user interface on user device 120. In some embodiments, user interface 122 is a local app interface of a program (e.g., software configured to execute the steps of the invention described herein) on user device 120. In some embodiments, user interface 122 is a graphical user interface (GUI), a web user interface (WUI), and/or a voice user interface (VUI) that can display (i.e., visually), present (i.e., audibly), and/or enable a user to enter or receive information (i.e., graphics, text, and/or sound) for or from the program via network 110. In an embodiment, user interface 122 enables a user to send and receive data (i.e., to and from the program via network 110, respectively).

Database 124 may operate as a repository for data associated with server 125, user device 120, and other data transmitted within network 110. A database is an organized collection of data. For example, order data may include data corresponding with an order placed on user device 120. Further, order data may include data associated with a user of user device 120. Order data may include data corresponding to user information, customer information, store information, order information, payment information, delivery information, or any other information associated with or gathered in the process of a user placing an order within the scope of the embodiments described herein.

Database 124 can also be implemented with any type of storage device capable of storing data and configuration files that can be accessed and utilized by user device 120, such as a database server, a hard disk drive, or a flash memory. In an embodiment, database 124 may be accessed by user device 120 to store data associated with user device 120. In another embodiment, database 124 may be accessed by user device 120 to access data as described herein. In an embodiment, database 124 may reside independent of network 110. In another embodiment, database 124 may reside elsewhere within distributed data processing environment 100 provided database 124 has access to network 110.

In the depicted embodiment, server(s) 125 may contain a program (e.g., software configured to execute the steps of the invention described herein, product recommendation program 132) and database 124. In some embodiments, server(s) 125 can be a standalone computing device(s), a management server(s), a web server(s), a mobile computing device(s), or any other electronic device(s) or computing system(s) capable of receiving, sending, and processing data. In some embodiments, server 125 may be a laptop computer, tablet computer, netbook computer, personal computer (PC), a desktop computer, a smart phone, or any programmable electronic device capable of communicating with user device 120 via network 110. In other embodiments, server(s) 125 represents a server computing system utilizing multiple computers as a server system, such as a cloud computing environment. In yet other embodiments, server(s) 125 represents a computing system utilizing clustered computers and components (e.g., database server computers, application server computers, etc.) that act as a single pool of seamless resources when accessed within distributed data processing environment 100. Server(s) 125 may include components as described in further detail in FIG. 4.

Product recommendation program 132 may be a mobile application software program, or a "mobile app" or an "app", designed to run on a smart phone, a tablet computer, or other mobile devices. Product recommendation program 132 may operate within a web browser, or other compatible software used for shopping displayed via user device 120. Product recommendation program 132 may be any native application or pre-installed software on a mobile computing device, such as user device 120. A native application can be, for example, a web browser, email client, mapping program, or an app for purchasing music, other media, or additional apps. Product recommendation program 132 may be a software application or a web application that can run in a mobile web browser.

Figure 2:
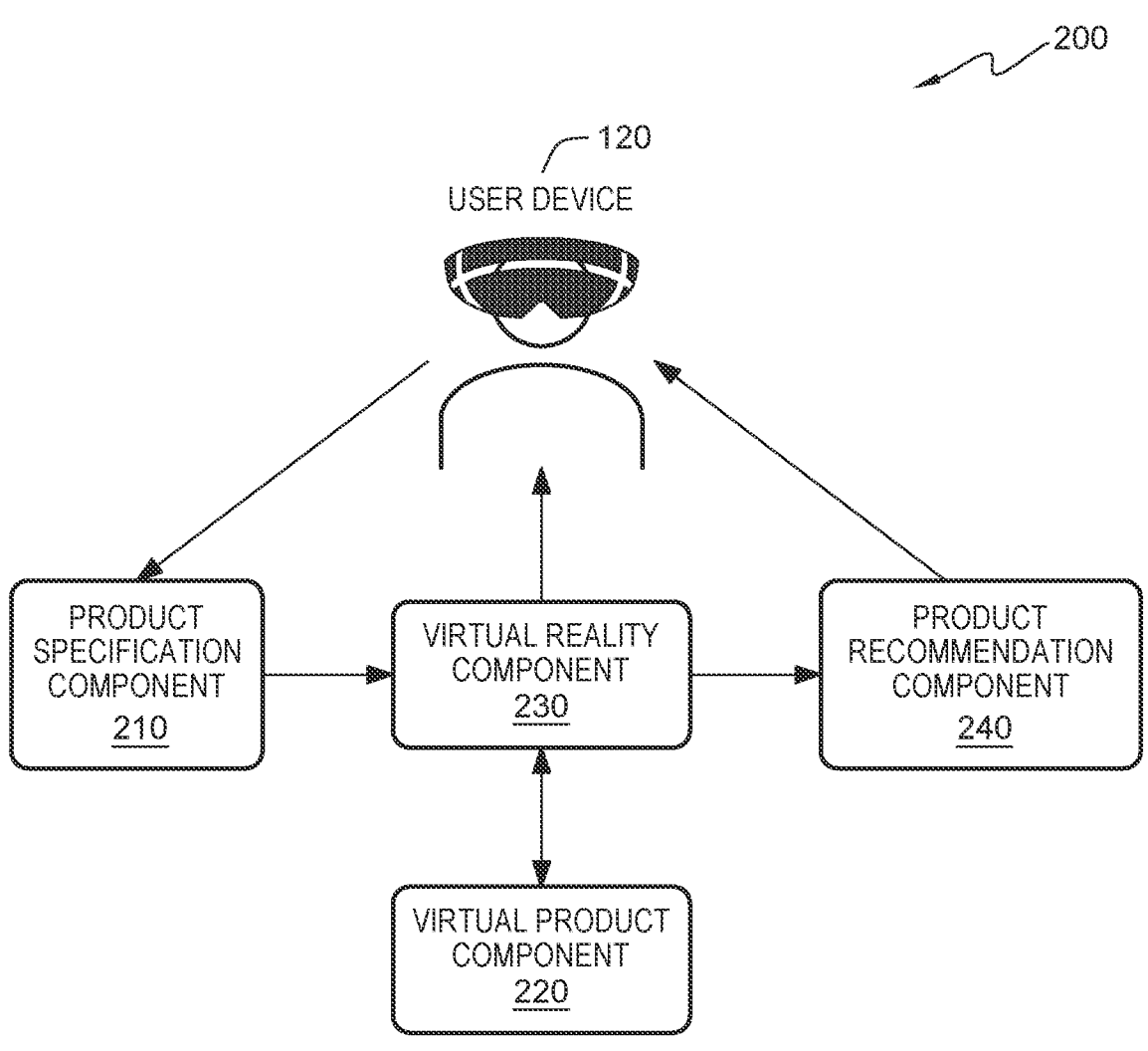
FIG. 2 is a block diagram of a system for recommending electronic products based on user specification, in accordance with an embodiment of the present invention.

FIG. 2 is a block diagram of system 200 for recommending electronic products based on user specification, in accordance with an embodiment of the present invention.

In an embodiment, system 200 may include product specification component 210 configured to receive user input data from user device 120 to determine product specifications. Further, product specification component 210 may be configured to receive user environment data from user device 120 or independent of user device 120 to determine product specifications based on the user input data and the user environment data.

In an embodiment, user input data may include text data, voice data, gesture data or any other type of user generated impression indicating a user intent to interact with user device 120. For example, user input data may include a user input (e.g., text, voice, gesture) to specify a desire to have a feature available in a user environment, wherein the feature corresponds to a feature of a product (e.g., electronic product, physical product) available via the product specifications and capabilities. For instance, if a user desires to have a surround sound in a living room of a home, then the user input may include a voice command saying, "I want surround sound in my living room," wherein the user requirement is "I want surround sound" and the user environment may be "the living room". Thus, product specification component 210 may be configured to receive the voice command as the user input, process the voice command to determine that the user requirement is the surround sound feature to be available in the user environment (e.g., the living room).

Further, in an embodiment, product specification component 210 may be configured to receive the user input as body gestures defining the boundary of the user environment in which the user desires to have the feature installed. For example, user input may be detected by user device 120 as both a voice utterance (e.g., "I want surround sound") and as a body gesture (e.g., head movement with VR headset spanning desired coverage area, hand movement with worn VR headset controller companion spanning desired coverage area).

In an embodiment, product specification component 210 may be configured to receive user environment data from user device 120, wherein user environment data may include one or more of spatial data and image data. Image data and spatial data may be based on images captured from image sensors of user device 120. Image data and spatial data may be obtained from a database in communication with user device 120 or other components within system 200 environment. Nonetheless, user environment data may correspond to image and spatial data configured to generate a virtual reality environment or augmented reality environment of user environment. User environment data may also include data corresponding to electronic devices identified within user environment, wherein virtual reality component 230 may be configured to generate virtual models of the identified electronic devices within user environment.

In an embodiment, system 200 may include virtual product component 220 configured to generate virtual models of one or more electronic device products available for sale at a retail facility. For example, virtual product component 220 may be configured to access a retail facility server computer to receive product data comprising product features (e.g., images, specifications, capabilities) and generate virtual models of the products for implementation within a virtual reality environment displayed within a user interface of user device 120.

In an embodiment, system 200 may include virtual reality component 230 configured to generate a virtual reality environment comprising visual elements corresponding to one or more of the user environment and electronic product devices, wherein the electronic product devices may include existing electronic devices or recommended electronic product devices determined based on the user requirement.

In an embodiment, system 200 may include product recommendation component 240 configured to determine one or more product recommendations corresponding to one or more electronic devices based on the product specification data, wherein the one or more product recommendations are configured to satisfy the user specified requirements.

Figure 3:
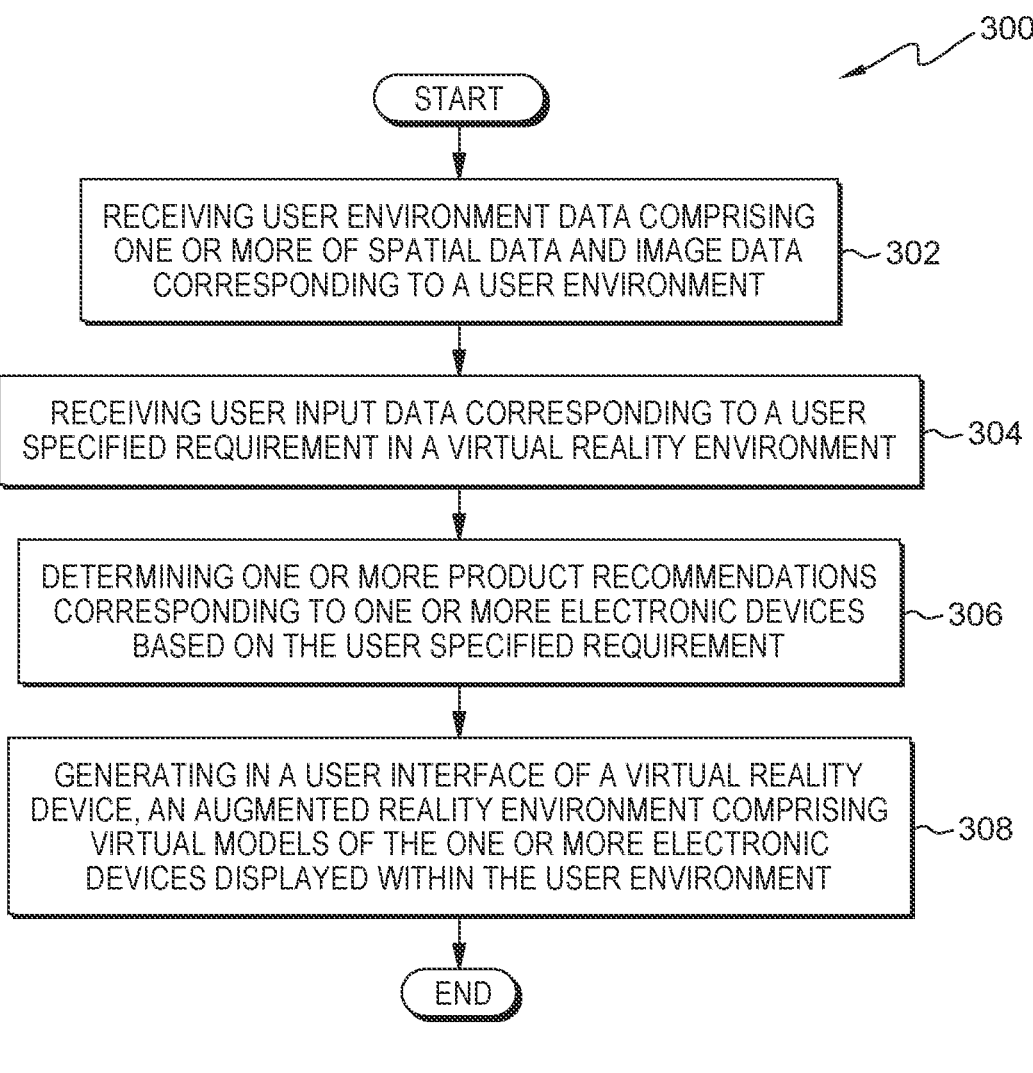
FIG. 3 is a flowchart depicting operational steps of a product recommendation program, on a server computer within the distributed data processing environment of FIG. 1, in accordance with an embodiment of the present invention.

FIG. 3 is a flowchart depicting operational steps of a computer-implemented method 300 for executing product recommendation program, on a server computer within the distributed data processing environment of FIG. 1, in accordance with an embodiment of the present invention.

In an embodiment, computer-implemented method 300 for recommending electronic products based on user specifications in an immersive reality environment may include one or more processors configured to execute product recommendation program 132.

In an embodiment, computer-implemented method 300 may include one or more processors configured for receiving 302 user environment data comprising one or more of spatial data and image data corresponding to a user environment. In an embodiment, receiving the user environment data may further include receiving user input via the user interface of the virtual reality device to capture images from the user environment via one or more image sensors of the virtual reality device, generating the spatial data and the image data based on the images captured from the user environment, and processing the spatial data and the image data to generate the user environment data.

In an embodiment, computer-implemented method 300 may include one or more processors configured for receiving 304 user input data corresponding to a user specified requirement in a virtual reality environment. In an embodiment, receiving user input data may further include receiving, at the user interface of the virtual reality device, a user input selected from a group consisting of a user gesture, a user voice input, and a user text input indicating the user specified requirement, determining a user input intent based on the user input, and generating the user input data based on the user input intent and the user input.

In an embodiment, computer-implemented method 300 may include one or more processors configured for generating a virtual reality simulation of the user input within the augmented reality environment based on the user specified requirement and the product specification data, wherein the virtual reality simulation demonstrates how the one or more electronic devices will function according to the user specified requirements in the user environment. For example, the user specified requirement may include a user gesture pointing to a wall of a room and a user voice input indicating a desire to install an electronic device (e.g., a surround sound system) at the wall of the room, wherein the wall is visible to the user in an augmented reality display of a user interface of a virtual reality device. Further, the one or more processors may be configured to generate a virtual reality display of the electronic device (e.g., a surround sound system) in the augmented reality environment displayed in the user interface of the virtual reality device. Further, the one or more processors may be configured to generate audio output sounds corresponding to a demo of the electronic device (e.g., a surround sound system) in the augmented reality environment in the user interface of the virtual reality device, wherein the user may be presented with an entertainment experience comparable to how the electronic device (e.g., a surround sound system) would perform like if it was installed at the wall of the room.

In an embodiment, computer-implemented method 300 may include one or more processors configured for receiving virtual product data comprising product model data corresponding to one or more electronic device products available at a retail entity. For example, the one or more processors may be configured for accessing a database to obtain virtual product data and product model data for the electronic device (e.g., surround sound system) as described above herein. The virtual product data may include images and/or videos of the electronic device (e.g., a surround sound system) and the product model data may include product specifications (e.g., brand, model, serial number, color, features) of the electronic device (e.g., a surround sound system).

In an embodiment, computer-implemented method 300 may include one or more processors configured for generating in a user interface of a virtual reality device, an augmented reality environment corresponding to the user environment based on the spatial data and the image data.

In an embodiment, computer-implemented method 300 may include one or more processors configured for identifying one or more local user electronic device products in the user environment, generating virtual models of the one or more local user electronic device products in the augmented reality environment. For example, the one or more processors may be configured for identifying a sound bar speaker as the local user electronic device product in an entertainment room defining the user environment. Once the local user electronic device product (e.g., sound bar speaker) is identified, the one or more processors may be configured to generate a virtual model of the local user electronic device product (e.g., sound bar speaker) in the augmented reality environment based on based on images captured or image data retrieved from a database of the local user electronic device product (e.g., sound bar speaker).

In an embodiment, computer-implemented method 300 may include one or more processors configured for receiving product specification data corresponding to user requirements for a selection of one or more of the one or more electronic device products. For example, the virtual reality device may be configured to receive user input data corresponding to a selection of the electronic device (e.g., surround sound system) product, wherein the selection may correspond to a product quantity, a product model, a product style, a product color, or any other specification of the product that is selectable during a typical item selection at a retail store. The selection may be provided by the user as a user input selected from a group consisting of a user gesture, a user voice input, and a user text input indicating the user selection within the augmented reality environment.

In an embodiment, computer-implemented method 300 may include one or more processors configured for and generating product specific virtual models of the selection of the one or more of the one or more electronic device products in the augmented reality environment based on the product specification data.

In an embodiment, computer-implemented method 300 may include one or more processors configured for determining 306 one or more product recommendations corresponding to one or more electronic devices based on the product specification data to satisfy the user specified requirements. In an embodiment, determining the one or more product recommendations may further include identifying one or more existing user products in the user environment based on the image data, determining that the one or more existing user products will satisfy the user specified requirement with an addition of one or more accessories, and generating one or more product addition recommendations as a part of the one or more product recommendations.

In an embodiment, computer-implemented method 300 may include one or more processors configured for receiving, existing product data comprising current condition data and a relative position with respect to the virtual reality device of the one or more existing user products.

Furthermore, computer-implemented method 300 may include one or more processors configured for determining upgrade recommendations for one or more of the one or more existing user products based on the current condition, wherein the upgrade recommendations comprise an updated position of the one or more existing user products based on the relative position and the image data.

Furthermore, computer-implemented method 300 may include one or more processors configured for receiving virtual product data based on the product specification data, wherein generating the virtual models is based on the virtual product data.

In an embodiment, computer-implemented method 300 may include one or more processors configured for transmitting product recommendation data corresponding to the one or more product recommendations to the virtual reality device.

In an embodiment, the computer-implemented method includes one or more processors configured for identifying one or more local user electronic device products in the user environment, generating virtual models of the one or more local user electronic device products in the augmented reality environment.

In an embodiment, user device 120 may include an augmented reality (AR) wearable smart glasses device and accompanying controllers. For example, the user device may include AR glasses (e.g., smartglasses), smartphone AR (e.g., mobile AR), a tethered AR headset, or any other AR wearable smart device known to those of ordinary skill in the art.

In an embodiment, the computer-implemented method may include one or more processors configured for receiving a first indication that the user is wearing the user device. In an embodiment, the user device may include sensors configured for detecting placement on the user's face or detecting the instance when the user wears the user device.

In an embodiment, the one or more processors may be configured to request a user action for the item. For example, a user action may include an item query (e.g., item description, item price, item expiration date), purchase item, inspect item (e.g., perform a 360-degree view of item), return item (e.g., place item back into virtual store).

In an embodiment, the computer-implemented may include one or more processors configured for generating a user prompt requesting an item quantity. For example, once an item is identified and the user submits a request to retrieve the item, the one or more processors may be configured to generate a user prompt requesting an item quantity, present the user prompt to the user, and await a response from the user. The user prompt may be presented to the user via a user interface, an audio message, or any other communication medium that the user is able to perceive.

In an embodiment, the computer-implemented method may include one or more processors configured for updating a database with the item quantity. For example, if the user submits a user response to the user prompt with an item quantity, and the user device receives the user response, then the one or more processors may be configured to store the user response including the item quantity in a database.

In an embodiment, the computer-implemented method may include one or more processors configured for generating an invoice based at least on the item, the item quantity, and the customer authentication data. For example, once the user device has received an indication to purchase the item, the one or more processors may be configured to generate an invoice comprising the item description, quantity, price, and other pertinent information normally displayed on an invoice. The invoice may be displayed on the user interface of the user device.

In an embodiment, the computer-implemented method may include one or more processors configured for providing the invoice to the user. For example, the user device may be configured to present, display, or provide the invoice to the user via a user interface (e.g., display monitor, or other communication medium) or a peripheral printer.

In an embodiment, the computer-implemented method may include one or more processors configured for processing payment information received from the user. For example, the user device may include a chip reader or payment processing software to receive user authorization to process user payment information for the invoice presented to the user.

The present invention may contain various accessible data sources, such as databases, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Product recommendation program 132 enables the authorized and secure processing of personal data. Product recommendation program 132 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Product recommendation program 132 provides information regarding personal data and the nature (e.g., type, scope, purpose, duration, etc.) of the processing. Product recommendation program 132 provides the user with copies of stored personal data. Product recommendation program 132 allows the correction or completion of incorrect or incomplete personal data. Product recommendation program 132 allows the immediate deletion of personal data.

Figure 4:
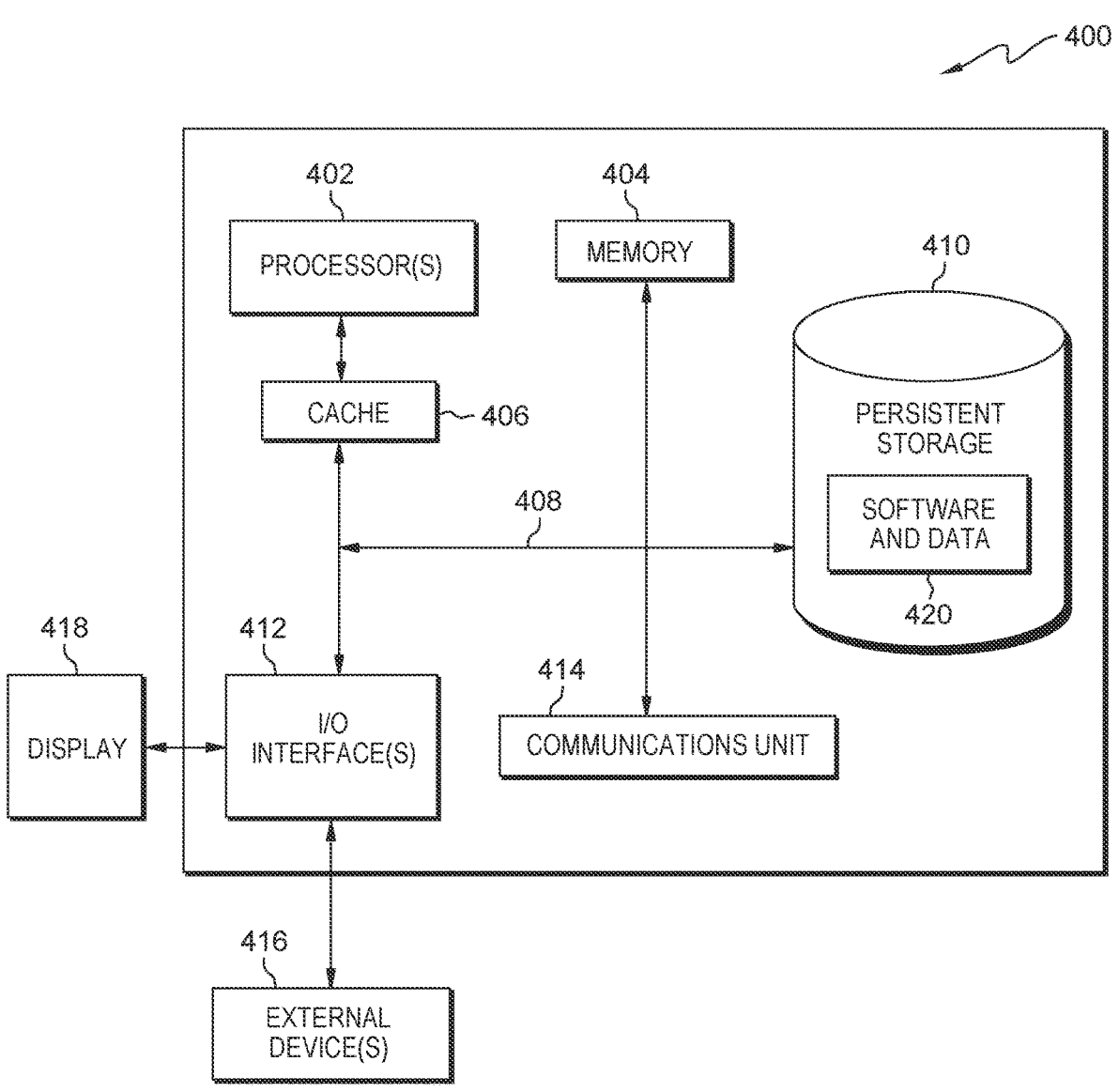
FIG. 4 depicts a block diagram of components of the server computer executing the product recommendation program within the distributed data processing environment of FIG. 1, in accordance with an embodiment of the present invention.

FIG. 4 depicts a block diagram of components of the server computer 400 executing product recommendation program 132 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

User device 120 can include processor(s) 402, memory 404, cache 406, persistent storage 410, input/output (I/O) interface(s) 412, communications unit 414, and communications fabric 408. Communications fabric 408 provides communications between memory 404, cache 406, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses.

Memory 404 and persistent storage 410 are computer readable storage media. In this embodiment, memory 404 includes random access memory (RAM). In general, memory 404 can include any suitable volatile or non-volatile computer readable storage media. Cache 406 is a fast memory that enhances the performance of processor(s) 402 by holding recently accessed data, and data near recently accessed data, from memory 404.

Program instructions and data used to practice embodiments of the present invention, such as product recommendation program 132, can be stored in persistent storage 410 for execution and/or access by one or more of the respective processor(s) 402 of user device 120 via cache 406. In this embodiment, persistent storage 410 includes a magnetic hard disk drive. Alternatively, or in addition to a magnetic hard disk drive, persistent storage 410 can include a solid-state hard drive, a semiconductor storage device, a read-only memory (ROM), an erasable programmable read-only memory (EPROM), a flash memory, or any other computer readable storage media or device that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer readable storage medium that is also part of persistent storage 410.

Communications unit 414, in these examples, provides for communications with other data processing systems or devices, including resources of user device 120. In these examples, communications unit 414 includes one or more network interface cards. Communications unit 414 may provide communications through the use of either or both physical and wireless communications links. Software and data 420 used to practice embodiments of the present invention, for example, product recommendation program 132, may be downloaded to persistent storage 410 through communications unit 414.

I/O interface(s) 412 allows for input and output of data with other devices that may be connected to user device 120. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data 420 used to practice embodiments of the present invention can be stored on such portable computer readable storage media and can be loaded onto persistent storage 410 via I/O interface(s) 412. I/O interface(s) 412 also connect to a display 418.

Display 418 provides a mechanism to display data to a user and may be, for example, a computer monitor or an incorporated display screen, such as is used, for example, in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a computer system, a computer-implemented method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

receiving, by one or more processors, user environment data comprising spatial data and image data corresponding to a user environment, wherein receiving the user environment data further comprises:

receiving, by one or more processors, user input via the user interface of the virtual reality device to capture images from the user environment via one or more image sensors of the virtual reality device;

generating, by the one or more processors, the spatial data and the image data based on the images captured from the user environment; and processing, by one or more processors, the spatial data and the image data to generate the user environment data;

receiving, by one or more processors, user input data corresponding to a user specified requirement for the user environment in a virtual reality environment, wherein the user specified requirement includes a coverage boundary for a function of one or more electronic devices;

determining, by one or more processors, one or more product recommendations corresponding to the one or more electronic devices based on the user specified requirement; and generating, by one or more processors, in a user interface of a virtual reality device, a virtual view in a virtual reality environment comprising virtual models of the one or more electronic devices displayed within the user environment.

2. The computer-implemented method of claim 1, wherein receiving the user input data further comprises:

receiving, by one or more processors, at the user interface of the virtual reality device, a user input selected from a group consisting of a user gesture, a user voice input, and a user text input, wherein the user input corresponds to the user specified requirement;

determining, by one or more processors, a user input intent based on the user input; and generating, by one or more processors, the user input data based on the user input intent and the user input.

3. The computer-implemented method of claim 1, wherein determining the one or more product recommendations further comprises:

identifying, by one or more processors, one or more existing user products in the user environment based on the image data;

determining, by one or more processors, that the one or more existing user products will satisfy the user specified requirement with an addition of one or more accessories; and generating, by one or more processors, one or more product addition recommendations as a part of the one or more product recommendations.

4. The computer-implemented method of claim 3, further comprising:

receiving, by one or more processors, existing product data comprising current condition data and a relative position with respect to the virtual reality device of the one or more existing user products; and determining, by one or more processors, upgrade recommendations for one or more of the one or more existing user products based on the current condition, wherein the upgrade recommendations comprise an updated position of the one or more existing user products based on the relative position and the image data.

5. The computer-implemented method of claim 1, further comprising:

receiving, by one or more processors, virtual product data based on product specification data, wherein generating the virtual models is based on the virtual product data.

6. The computer-implemented method of claim 2, further comprising:

generating, by one or more processors, a virtual reality simulation of the user input within an augmented reality environment based on the user specified requirement and product specification data, wherein the virtual reality simulation demonstrates how the one or more electronic devices will function according to the user specified requirements in the user environment.

7. A computer program product, comprising:

one or more computer readable storage media and program instructions stored on the one or more computer readable storage media, the program instructions comprising:

program instructions to receive user environment data comprising spatial data and image data corresponding to a user environment, wherein the program instructions to receive the user environment data further comprises:

receiving, by one or more processors, user input via the user interface of the virtual reality device to capture images from the user environment via one or more image sensors of the virtual reality device;

generating, by the one or more processors, the spatial data and the image data based on the images captured from the user environment; and processing, by one or more processors, the spatial data and the image data to generate the user environment data;

program instructions to receive user input data corresponding to a user specified requirement for the user environment in a virtual reality environment, wherein the user specified requirement includes a coverage boundary for a function of one or more electronic devices;

program instructions to determine one or more product recommendations corresponding to the one or more electronic devices based on the user specified requirement; and program instructions to generate in a user interface of a virtual reality device, a virtual view in a virtual reality environment comprising virtual models of the one or more electronic devices displayed within the user environment.

8. The computer program product of claim 7, wherein the program instructions to receive the user input data further comprises:

program instructions to receive at the user interface of the virtual reality device, a user input selected from a group consisting of a user gesture, a user voice input, and a user text input indicating the user specified requirement;

program instructions to determine a user input intent based on the user input; and program instructions to generate the user input data based on the user input intent and the user input.

9. The computer program product of claim 7, wherein the program instructions to determine the one or more product recommendations further comprises:

program instructions to identify one or more existing user products in the user environment based on the image data;

program instructions to determine that the one or more existing user products will satisfy the user specified requirement with an addition of one or more accessories; and program instructions to generate one or more product addition recommendations as a part of the one or more product recommendations.

10. The computer program product of claim 9, further comprising:

program instructions to receive existing product data comprising current condition data and a relative position with respect to the virtual reality device of the one or more existing user products; and program instructions to determine upgrade recommendations for one or more of the one or more existing user products based on the current condition, wherein the upgrade recommendations comprise an updated position of the one or more existing user products based on the relative position and the image data.

11. The computer program product of claim 7, further comprising:

program instructions to receive virtual product data based on a product specification data, wherein the program instructions to generate the virtual models is based on the virtual product data.

12. The computer program product of claim 8, further comprising:

program instructions to generate a virtual reality simulation of the user input within the virtual reality environment based on the user specified requirement and product specification data, wherein the virtual reality simulation demonstrates how the one or more electronic devices will function according to the user specified requirements in the user environment.

13. A computer system, comprising:

one or more computer processors;

one or more computer readable storage media;

program instructions stored on the one or more computer readable storage media for execution by at least one of the one or more processors, the program instructions comprising:

program instructions to receive user environment data comprising spatial data and image data corresponding to a user environment, wherein the program instructions to receive the user environment data further comprises:

receiving, by one or more processors, user input via the user interface of the virtual reality device to capture images from the user environment via one or more image sensors of the virtual reality device;

generating, by the one or more processors, the spatial data and the image data based on the images captured from the user environment; and processing, by one or more processors, the spatial data and the image data to generate the user environment data;

program instructions to receive user input data corresponding to a user specified requirement for the user environment in a virtual reality environment, wherein the user specified requirement includes a coverage boundary for a function of one or more electronic devices;

program instructions to determine one or more product recommendations corresponding to the one or more electronic devices based on the user specified requirement; and program instructions to generate in a user interface of a virtual reality device, a virtual view in a virtual reality environment comprising virtual models of the one or more electronic devices displayed within the user environment.

14. The computer system of claim 13, wherein the program instructions to receive the user input data further comprises:

program instructions to receive at the user interface of the virtual reality device, a user input selected from a group consisting of a user gesture, a user voice input, and a user text input indicating the user specified requirement;

program instructions to determine a user input intent based on the user input; program instructions to generate the user input data based on the user input intent and the user input; and program instructions to generate a virtual reality simulation of the user input within an augmented reality environment based on the user specified requirement and product specification data, wherein the virtual reality simulation demonstrates how the one or more electronic devices will function according to the user specified requirements in the user environment.

15. The computer system of claim 13, wherein the program instructions to determine the one or more product recommendations further comprises:

program instructions to identify one or more existing user products in the user environment based on the image data;

program instructions to determine that the one or more existing user products will satisfy the user specified requirement with an addition of one or more accessories; and program instructions to generate one or more product addition recommendations as a part of the one or more product recommendations.

16. The method of claim 1, wherein the product recommendation includes updating a position of a first device in the user environment.

17. The method of claim 16, wherein the user environment data includes a location of the first device in the user environment.

* * * * *